United States Patent [19]

Pieri

[11] Patent Number: 5,934,517
[45] Date of Patent: Aug. 10, 1999

[54] SYSTEM FOR UNLOADING MATERIALS FROM CONTAINERS

[75] Inventor: Luciano Pieri, Lucca, Italy

[73] Assignee: Zanchetta & C. S.r.L., Lucca, Italy

[21] Appl. No.: 08/865,500

[22] Filed: May 29, 1997

[30] Foreign Application Priority Data

May 31, 1996 [IT] Italy .................................. BO96A0297

[51] Int. Cl.⁶ .............................. B67D 5/06; B65D 35/56
[52] U.S. Cl. ....................................... 222/185.1; 222/105
[58] Field of Search ................................ 222/105, 185.1, 222/181.1, 181.2, 181.3

[56] References Cited

U.S. PATENT DOCUMENTS

| 3,971,493 | 7/1976 | Williams ............................. 222/185.1 |
| 4,942,953 | 7/1990 | Chefson .................................... 193/25 |
| 5,799,825 | 9/1998 | Dillman ............................... 222/185.1 |

FOREIGN PATENT DOCUMENTS

| 2 490 196 | 3/1982 | France . |
| 2 562 525 | 10/1985 | France . |
| 2562525 | 10/1985 | France . |
| 4240 014 A1 | 6/1994 | Germany . |

*Primary Examiner*—Andres Kashnikow
*Assistant Examiner*—Keats Quinalty
*Attorney, Agent, or Firm*—Fay, Sharpe, Beall, Fagan, Minnich & McKee

[57] ABSTRACT

A system for unloading loose materials from containers is fitted with a cartridge that defines a containing chamber for a tubular bag gathered in a resting position. The cartridge can be connected with an upper end to an outlet presented by a container to be emptied and the lower end presents a flange or cap that can be coupled to a connector arranged downstream. The system may also include a two-way drive mechanism for the flange or cap through a tube arranged between the container and the devices to be connected. The drive mechanism is designed to pass the bag, itself, extended in an operating position and to transfer the flange or cap outside the tube so as to allow the connection between the tubular bag and the devices to be connected.

14 Claims, 6 Drawing Sheets

SYSTEM FOR UNLOADING MATERIALS FROM CONTAINERS

BACKGROUND OF THE INVENTION

The present invention relates to a system designed for unloading loose and powdery materials from containers. The system disclosed can be used, in particular, in the chemical and/or pharmaceutical industry and in cases in which containers with loose material such as powders, fine-grain material and similar materials must be unloaded.

The containers are emptied at an unloading station which moves the material from containers to a collecting tank or a similar vessel connected, for example, to a machine that utilizes the aforementioned loose material for subsequent processing. The collecting tank is arranged at a certain level and a supporting structure is above it and designed to allow the positioning of a container at another level, above the previous one, so that the container can be emptied by gravity. To allow the downflow of the material from the upper container to the lower tank, connection means are provided between the two levels consisting of a rigid cylindrical tube arranged vertically, inside which there is a tubular bag whose ends are secured, respectively to the container unloading outlet and to the loading inlet of the tank or hopper.

The powder in the container is emptied through the tubular bag which must be connected to the container and to the hopper through a sealed connection, so that the powders cannot escape: in practice, powder scattering in the environment must be limited as much as possible. To close the tubular bag and the container, fastening means are utilized, such as clips or seal rings, coupled with closing means such as butterfly valves and similar components.

In spite of the presence of the fastening and closing means, in currently used systems, a first problem is related to the possibility of powder scattering in the environment. This is a common problem because the materials being transferred can be widely scattered in the air due to their structure (that is to say, the dimensions of the granules of which they are composed) and/or to their low specific). Consequently the closing means heretofore and the fastening means utilized are often inadequate.

The importance of this problem is highlighted by the fact that the powders can be chemical substances or compounds that are not easily degradable in the environment and, in some cases, potentially hazardous. Another negative aspect of the currently used systems concerns a connection between the container and the collecting tank created as previously described. Such prior connections have been found to allow the scattering of material, at least on some occasions (for example, upon the connecting and disconnecting operations of the tubular bag ends at the beginning and at the end of every unloading operation).

In fact, since containers containing different substances are emptied at the same unloading station, the substances could contaminate one another. For this reason, different tubular bags should be used for different substances and/or the connection should be thoroughly cleaned when changing over from one substance to another.

SUMMARY OF THE INVENTION

These and other aims are all achieved by the present invention which provides a system for unloading loose materials from containers at an unloading station consisting of a substantially vertical structure. The unloading structure includes a first upper level, at which support means are provided for a container and designed to support and position the container so that it is arranged with its outlet turned downwards. The unloading station also includes a second, lower level where connection means to a tank, a hopper or other subsequent containing or utilization means are provided. The first and second levels are connected to one another by means of a hollow element or tube which is mechanically resistant and designed to contain a tubular bag that defines a transit channel for transferring material from the container to the connection means. The system further includes a cartridge defining a containing chamber for the tubular bag gathered in a resting position, which cartridge can be connected at one upper end with the container outlet, while one lower end has a flange or cap which can be connected with the connection means. Means are provided to drive the flange or cap from the upper level to the lower level through the tube in both directions and designed to pass the bag extended in an operating position and to transfer the flange, once it has reached the lower level, to the outside of the tube so as to allow the tubular bag to be connected to the connection means.

The advantages of the present invention include the creation of a connection, between the container to be emptied and the tank (or hopper or similar object) isolated from the surrounding area and hence designed to prevent the undesired scattering of powders in the environment.

Moreover, the fact that the tubular bag can be coupled with the container eliminates the negative aspects that occur, in known systems, when the type of transferred material changes, causing the different materials to contaminate each other and creating the need for procedures to limit the contamination.

Therefore another advantage derives from the connection between the bag and the container. In practice, each container can be fitted with its own bag (which can also be a disposable type of bag). For this reason, when different powders are used, there is no need to clean the rigid unloading and connection duct.

Instead of the bag, it is possible to use a cartridge, which may also be of the disposable type, that can be connected to the container when the latter is being unloaded. In this manner, it is possible to keep using the known standard containers, that is to say, not fitted with their own cartridge.

BRIEF DESCRIPTION OF THE DRAWINGS

Further characteristics and advantages of the invention are apparent from the detailed description which follows, with reference to the accompanying drawings, which illustrate preferred embodiments of the invention by way of example and in which:

FIG. 4 is a full front view of another embodiment of the present invention;

DESCRIPTION OF THE PREFERRED EMBODIMENTS

Figure 1:
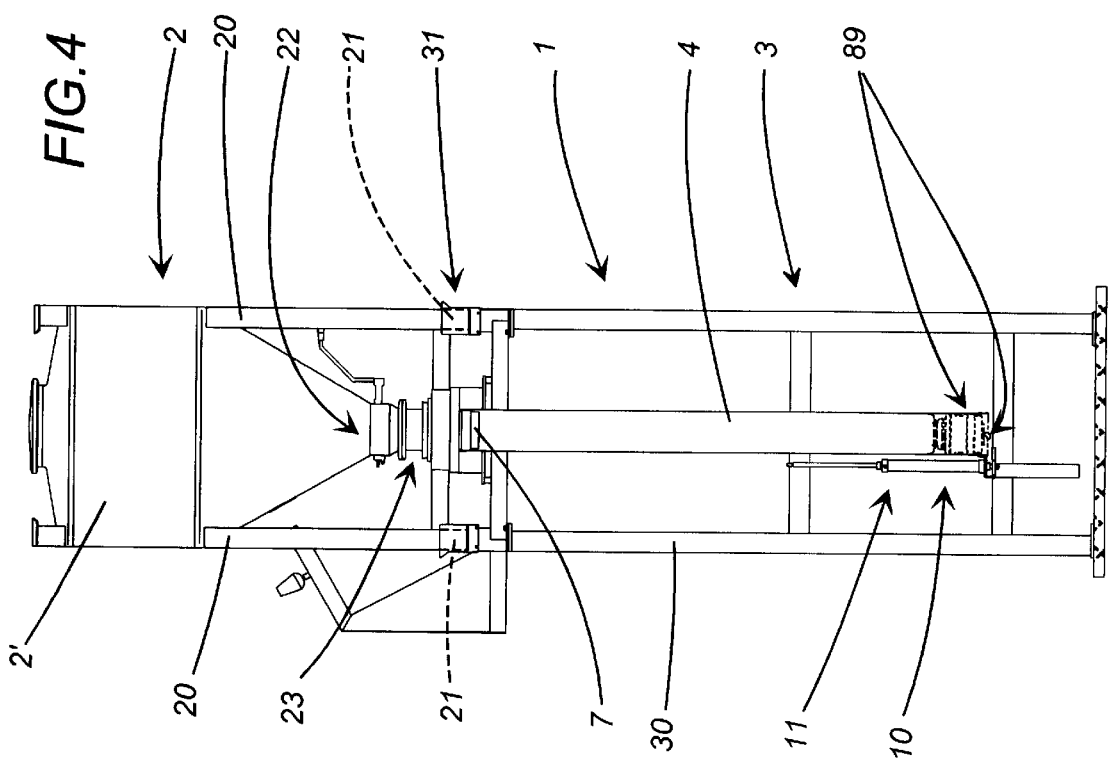
FIG. 1 is a full front view of an embodiment of the present invention.

With reference to the drawings listed above, the numeral 1 indicates a system created in accordance with the present invention, wherein the elements that are not strictly pertinent to the invention are not numbered. The system 1 can be used for unloading loose materials from containers; in particular, a container 2 is shown in the drawings.

In the illustrated examples, the system 1 includes an unloading station 3 consisting of a structure 30 substantially arranged vertically, presenting a first upper level L1 and a second lower level L2. In practice, the structure 30 simulates a difference in height between two levels; in other words, structure 30 represents all those situations in which there is an unloading station on a raised floor that supports the container and a collecting tank on a lower floor.

Support means for container 2 are provided at the first level L1. In the example in the drawings, the container 2 consists of a real container or vessel 2' and a structure 20 that supports the container.

The support means presented by structure 30 of the unloading station 3 consist of the upper portion of the structure 30 itself that has some seats 31 in which are inserted corresponding lower portions 21 of the support structure 20 of the container 2.

The container 2 is supported and positioned, by means of the seats 31, with its own outlet 22 turned downwards.

Connection means to a tank, a hopper or any other suitable subsequent containing or utilization means, not shown in the drawings, are provided on the second lower level L2.

The first level L1 and the second level L2 are connected to one another by means of a hollow element or tube 4, mechanically resistant and designed to contain a tubular bag 5 that defines a transit channel for transferring the material from the container to the aforementioned connection means.

Advantageously, the system 1 is fitted with a cartridge defining a containing chamber 23 of the tubular bag 5 in a resting position. In particular, with reference to FIGS. 2 and 5, it is the container 2 that is fitted, at the outlet 22, with the containing chamber 23; in practice, the cartridge 23 forms a single block with the container 2 to be emptied.

In this embodiment, the tubular bag 5 is connected at one end 51 with the outlet 22 of the container and at the free end 52 it is connected with a flange or cap 6 which can be coupled with the aforementioned connection means. The flange 6 is shaped and/or presents connecting means so that it can be held in the lower end portion of the containing chamber 23, that is to say, where the final outlet of the container 2 (in particular the outlet of vessel 2') is located, since the upper end 51 of the tubular bag 5 is secured on the primary outlet 22. For example, the flange or cap 6 can be held by creating an interference fit. Moreover reversible means 62 are provided to fasten the tubular bag 5 to an upper portion of the flange or cap 6, and means 63 are also included to close the bag itself, upstream of the reversible fastening means and operated independently of the latter. As can be better seen in the drawings of FIGS. 2 and 5, a clip 62 can be disposed on the free end 52 of the tubular bag 5 to secure the latter around the upper portion of the flange 6.

Upstream of the clip 62, that is to say between the free end of the tubular bag and the container 2, a sort of closing lace 63 is provided for the bag itself. In this manner, the tubular bag 5 can be connected to, and disconnected from, the flange 6 when one of the closing means is operated, that is to say in a condition in which the tubular bag is closed by the closing lace 63. Thanks to the closing means 63, even the connecting and disconnecting operations of the flange 6 with parts of the system downstream can be performed when the bag is closed, that is to say, with no scattering in the environment of material present in the container.

Two-way means are provided for moving the flange or cap 6 from the upper level L1 to the lower level L2 through tube 4. The two-way drive means which, as will be seen below can be made in different ways, are suitable for switching the bag itself to an operating position and for transferring the flange or cap 6, once it has reached the lower level L2, outside the tube 4 in order to allow the connection between the tubular bag 5 and the aforementioned connection means that are not illustrated. In other words, the flange 6 can be extracted from the tube 4 to be coupled with connection members or with machines downstream of the system 1.

Figure 2:
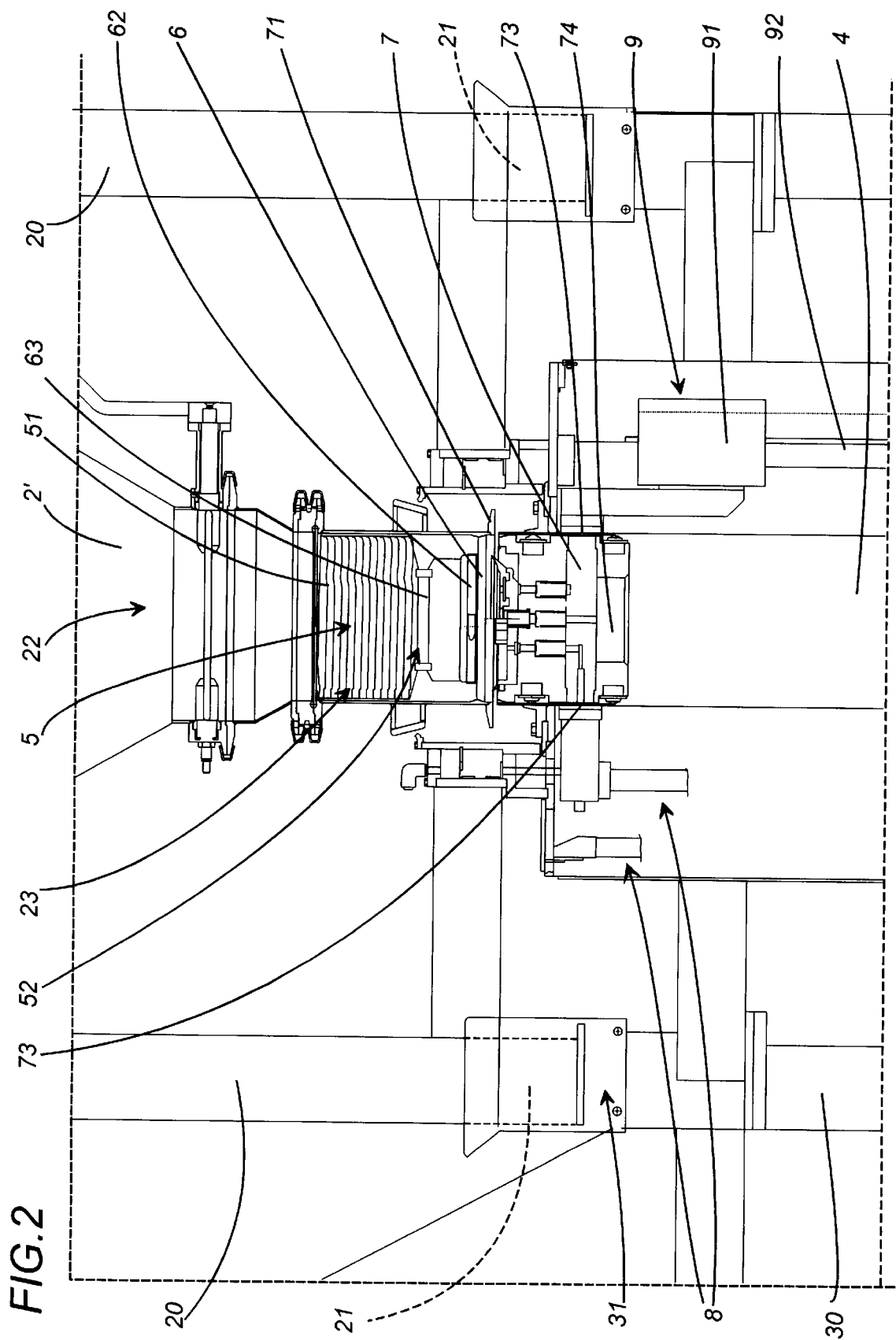
FIGS. 2 and 3 schematically illustrate parts of the embodiment shown in FIG. 1, in a front view with some parts in cross section and others cut away.
Figure 3:
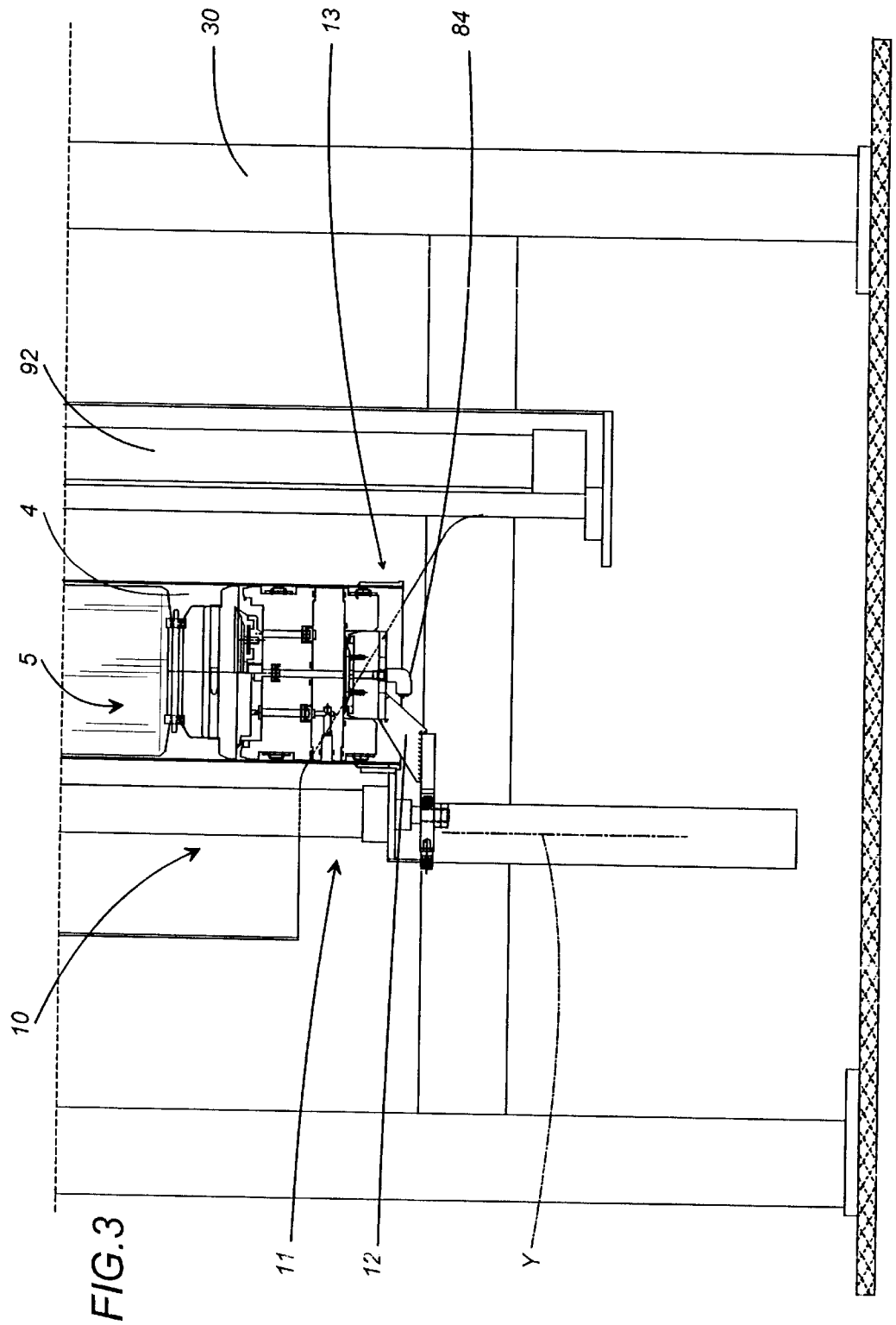

Now we will refer to the embodiment shown in FIGS. 1, 2 and 3.

In this embodiment, there is a piston 7 that slides inside the tube 4.

The piston presents an upper portion 71 substantially shaped like a cup or suction cup. The lower portion of the flange or cap 6 is shaped to match it: in practice at the bottom it is shaped so as to offer a surface that fits a suction cup.

Means, labelled 8 as a whole, are designed to generate a negative pressure between piston 7 and flange 6.

The means consist of a series of ducts through which the piston 7 is connected to a negative pressure source, so as to hold them together by pressure.

Motor means 9 for piston 7 are envisaged to drive the piston 7 to and from the levels L1 and L2 along the tube, that is to say, to and from the upper and lower ends of tube 4.

The motor means, in the embodiment of FIGS. 1, 2, 3, consist of a support 91 moved by appropriate motor means in order that it can move two ways on a stem or rod or guide 92. The support 91 is connected to the piston 7, so that the latter is driven up and down between the two ends of the tube 4.

The piston can be fitted with at least one wing or pin 73 arranged perpendicularly to the tube 4; likewise, the tube has at least one lengthwise slot in which the wing or pin 73 is inserted. In the drawings there are two wings and they are used for the passage of appropriate connection means between two-way drive means and piston 7.

At the lower end of the tube 4, at the lower level L2, second drive means 10 are provided and fitted with means 13 to retain the piston 7. These second drive means 10 are designed to position the retaining means between two limit positions: a first position which corresponds to a positioning of the piston inside the tube 4, at the lower end of the latter and, a second position which is outside the tube 4 and is lower than the first position.

In particular, referring to the embodiment in FIG. 3, the second drive means 10 can consist of a pneumatic cylinder 11, acting on a bracket 12 that supports the retaining means 13; the bracket 12 is guided along a path defined by a lowering along an axis Y parallel to the tube 4 and a rotation around the same axis Y. The retaining means 13 can consist of a cylindrical element that can be inserted in a corresponding seat 74 at the lower end of the piston 7; a duct 84 reaches the cylindrical element 13 which, by applying negative pressure, can hold the piston 7 during the movement performed at the lower level L2 before and after the disconnection of piston 7 from flange 6.

Figure 5:
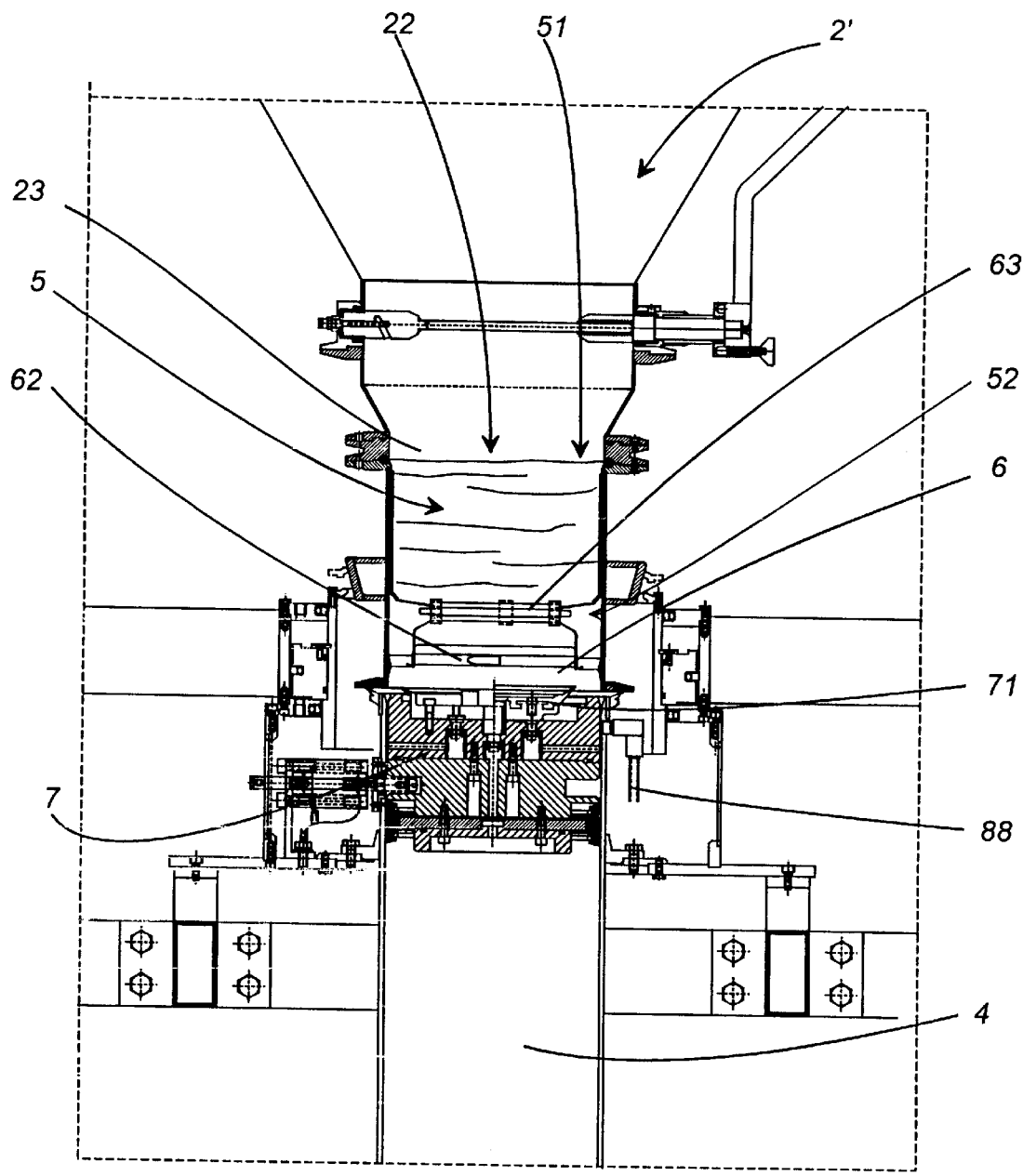
FIGS. 5 and 6 schematically illustrate parts of the embodiment shown in FIG. 4, in a front view with some parts in cross section and others cut away.
Figure 6:
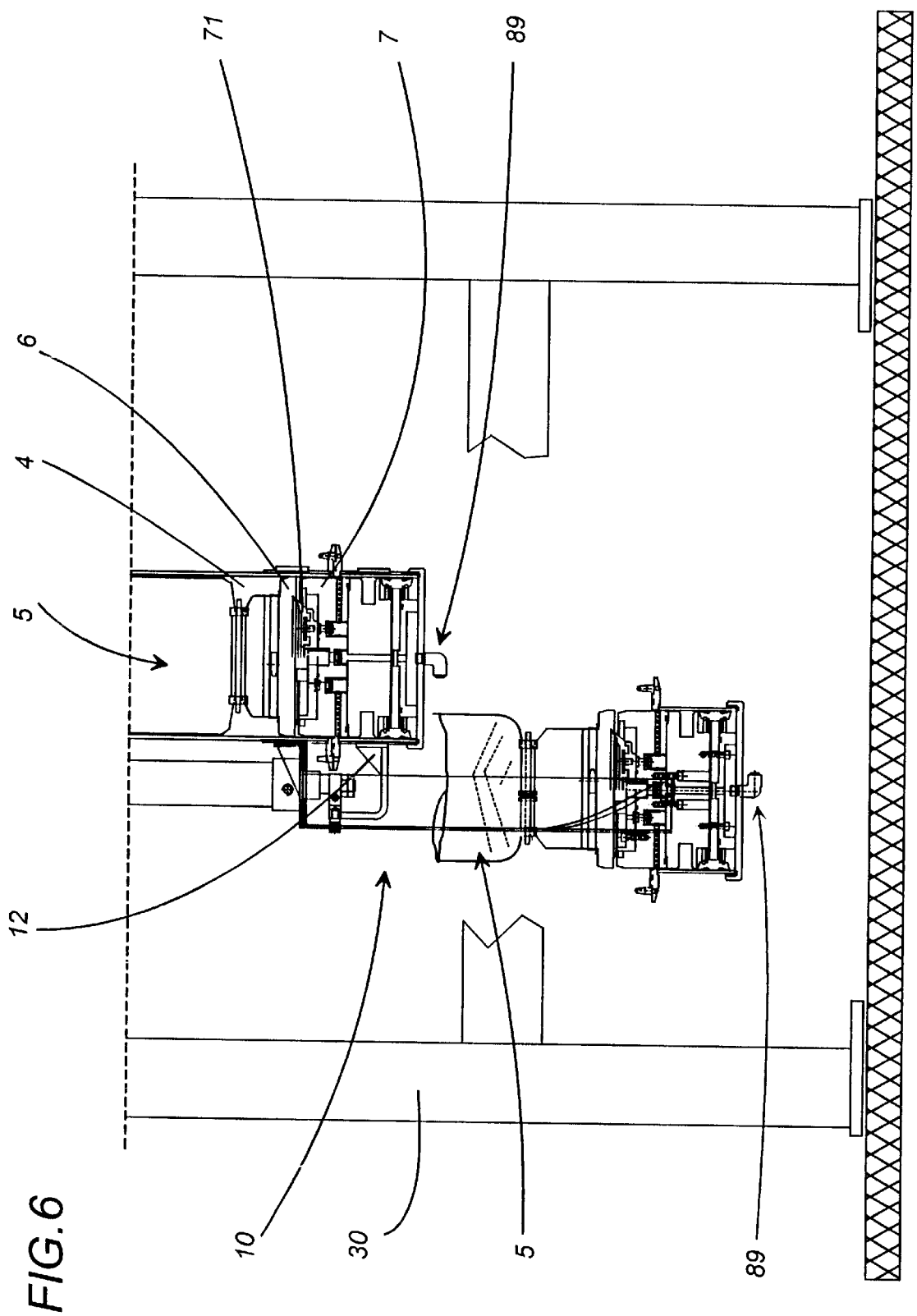

In the embodiment shown in FIGS. 4, 5, 6, the system 1 includes, among the two-way drive means, second means designed to generate a negative pressure acting inside the tube 4, at its ends, so as to pneumatically drive the piston lengthwise in the tube. The second means can include a pair of ducts 88,89, connected respectively to the upper and lower ends of the tube 4 and above and below the limit levels that can be reached by the piston 7, and designed to generate negative pressure so as to drive the piston vertically inside the tube 4.

The lower duct 89 can be arranged at the bracket 12 which is a part of the second drive means, so that it can also be used during the lower movement performed for the aforementioned disconnecting operations between the flange 6 and the piston 7.

Figure 7:
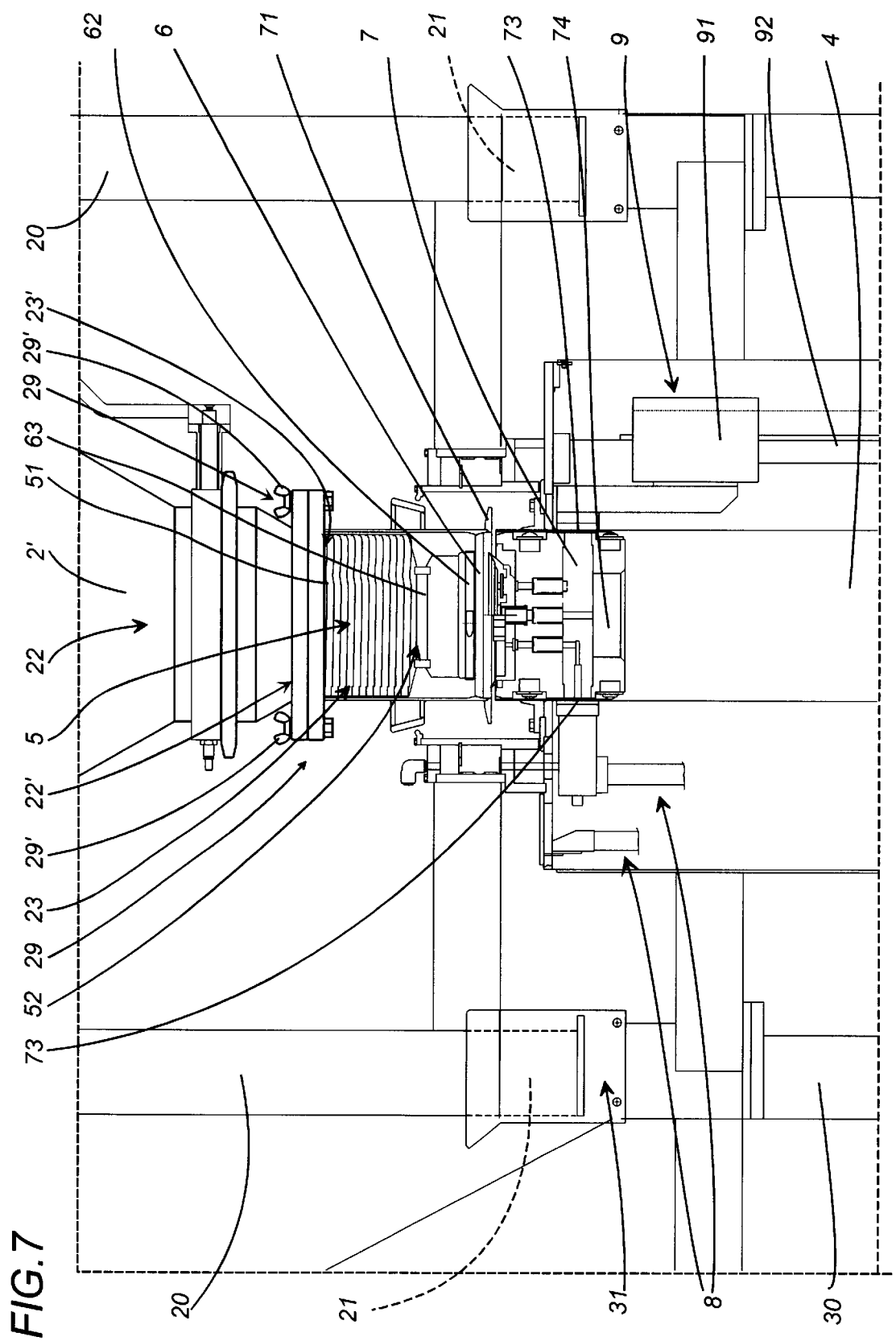
FIG. 7 schematically illustrates parts of yet another embodiment, in a front view with some parts in cross section and others cut away.

Instead of the embodiment shown in FIGS. from 1 to 6, the system, as shown in FIG. 7, can be arranged so that the cartridge 23 is separate from the container 2. In this case, the tubular bag 5 is inserted in a cartridge that can be connected to, and disconnected from, the container 2 by means of appropriate fittings 29, once the container has been unloaded. The fittings 29 can be made in different ways; for example, some clips can be used, or, as in the case illustrated, the lower portion of the outlet 22 can present an outlet 22' that is shaped to match a corresponding seat 23' provided at the top of the cartridge 23. Clip elements 29' can be arranged to operate between the outlet 22' and the seat 23', designed to keep the outlet 22' and the seat 23' joined and sealed together, possibly aided by suitable seals, not shown in the drawing.

In other words, the system 1, in this case, is provided so that the tubular bag 5, which in any case can be of the disposable type, remains steadily arranged at the upper end of the tube 4 and is connected to a container 2 only when the latter is emptied.

The present invention, thus designed for the said objects, may be subject to numerous modifications and variations, all encompassed by the original design concept. Moreover, all components may be replaced with technically equivalent parts.

What is claimed:

1. A system designed for unloading loose materials from containers, said system comprising:
    an unloading station including a substantially vertical structure with a first upper level, at which support means are provided for a container designed to support and position the container so that it is arranged with an outlet thereof turned downwards, and a second lower level, where connection means to a subsequent containing means are provided the first and second levels being connected to one another by means of a tube which is mechanically resistant and designed to contain a tubular bag that defines a transit channel for transferring material from the container to the connection means;
    a cartridge that defines a containing chamber for the tubular bag when the bag is gathered in a resting position, said cartridge adapted for connection at an upper end with the container outlet and having a lower end including a flange which can be connected with the connection means;
    means for driving the flange from the upper level to the lower level through the tube in both directions, said drive means designed to pass the bag so that the bag becomes extended into an operating position and to transfer the flange, once it has reached the lower level, outside the tube so as to allow the tubular bag to be connected to the connection means.

2. A system according to claim 1, wherein the cartridge is contained by the container in its lower portion, at the container outlet.

3. A system according to claim 1, wherein the cartridge can be connected and disconnected by means of fittings, arranged at a top of the cartridge and adapted for connection to the container outlet.

4. A system according to claim 1, wherein the two-way drive means comprise a piston that slides in the tube and means designed to generate a negative pressure acting on the piston and the flange, so as to hold them together.

5. A system according to claim 4, wherein the piston presents an upper portion substantially shaped like one of a cup and suction cup and wherein said flange presents a lower portion shaped to match, said one of said cup and suction cup so as to define, when said negative pressure generation means are enabled, a holding pressure between the piston and the flange.

6. A system according to claim 4, wherein motor means for the piston are, provided and arranged to drive the piston two-ways along the tube.

7. A system according to claim 6, wherein the motor means comprise:
    one of a stem, rod, and guide arranged parallel to the tube; and
    a support that moves two-ways on the one of the stem, rod, and guide said support connected to said piston.

8. A system according to claim 4, further comprising:
    second means for generating a negative pressure acting inside said tube, at ends of said tube, so as to pneumatically drive said piston lengthwise in said tube.

9. A system according to claim 4, further comprising:
    second drive means, arranged at lower end of said tube and fitted with retaining means for said piston, said second drive means adapted for positioning the retaining means between two limit positions of which a first position corresponds to a positioning of the piston inside and at a bottom of the tube, and a second position that corresponds to a positioning of the piston outside the tube and lower than the first position.

10. A system according to claim 9, wherein the second drive means further comprises:
    a pneumatic cylinder acting on a bracket that supports the retaining means and guided along a path defined by a lowering along an axis parallel to the tube and a rotation around the axis.

11. A system according to claim 4, wherein the piston is fitted with at least one of a wing and pin arranged perpendicularly to the tube, said tube having at least one lengthwise slot in which the said one of said wing and pin is inserted.

12. A system according to claim 11, wherein the two-way drive means is fitted with connection means to said piston and arranged to pass in the at least one slot.

13. A system according to claim 1, further comprising:
    reversible means for fastening the tubular bag to an upper portion of the said flange; and,
    means for closing the bag itself, upstream of the reversible fastening means and operated independently of the reversible fastening means so that the tubular bag can be connected to and disconnected from the flange when said closing means is operated into a condition in which the tubular bag is closed.

14. A system according to claim 4, further comprising:
    means for fastening the tubular bag to an upper portion of the flange; and means for closing the bag itself, upstream of the reversible fastening means, so as to allow the connection/disconnection of the piston to/from the flange when the closing means are enabled so that the tubular bag is closed.

* * * * *